United States Patent
Hollander (10) Patent No.: US 9,296,502 B1
(45) Date of Patent: Mar. 29, 2016

(54) GROUND COFFEE DISPENSER FOR MAKING COFFEE PODS

(71) Applicant: Aaron Hollander, Blue Springs, MO (US)

(72) Inventor: Aaron Hollander, Blue Springs, MO (US)

(*) Notice: Subject to any disclaimer, the term of this patent is extended or adjusted under 35 U.S.C. 154(b) by 0 days.

(21) Appl. No.: 14/451,507

(22) Filed: Aug. 5, 2014

(51) Int. Cl.
| | |
|---|---|
| B65B 29/06 | (2006.01) |
| B65B 1/06 | (2006.01) |
| B65B 1/24 | (2006.01) |
| B65D 47/26 | (2006.01) |
| A47F 1/02 | (2006.01) |
| G01F 11/26 | (2006.01) |
| B67D 3/00 | (2006.01) |
| B65G 53/46 | (2006.01) |
| G01F 11/24 | (2006.01) |

(52) U.S. Cl.
CPC . *B65B 29/06* (2013.01); *B65B 1/06* (2013.01); *B65B 1/24* (2013.01); *A47F 1/02* (2013.01); *B65D 47/263* (2013.01); *B65D 47/268* (2013.01); *B65G 53/4633* (2013.01); *B67D 3/00* (2013.01); *G01F 11/24* (2013.01); *G01F 11/261* (2013.01)

(58) Field of Classification Search
CPC ....... G01F 11/18; G01F 11/24; G01F 11/261; B65D 47/263; B65D 47/265; B65D 47/268; B67D 3/00; A47F 1/02; B65G 53/4633
USPC ............ 99/295, 287; 426/77; 222/185.1, 450, 222/452–453, 460–462, 360, 367–368
See application file for complete search history.

(56) References Cited

U.S. PATENT DOCUMENTS

| | | | | |
|---|---|---|---|---|
| 2,077,980 A | * | 4/1937 | Bell | A47J 42/40 141/369 |
| 2,259,710 A | | 10/1941 | Stern | |
| 3,204,833 A | | 9/1965 | Witzner | |
| 4,019,660 A | * | 4/1977 | Berkey | G01F 11/24 222/304 |
| 4,066,186 A | * | 1/1978 | Agey | G01F 11/24 222/144.5 |
| 4,079,860 A | * | 3/1978 | Maves | G01F 11/24 222/306 |
| 4,796,521 A | * | 1/1989 | Grossi | A47J 31/3609 99/287 |
| 5,071,041 A | * | 12/1991 | Garbe | B67D 3/00 222/405 |
| 5,230,277 A | * | 7/1993 | Bianco | A47J 31/3609 99/287 |
| 5,244,019 A | * | 9/1993 | Derby | B65B 1/26 141/314 |
| 5,255,594 A | * | 10/1993 | Grossi | A47J 31/3619 99/287 |
| D364,780 S | | 12/1995 | Henderson | |
| 5,499,749 A | * | 3/1996 | Conant | G01F 11/24 222/181.1 |
| 5,791,526 A | | 8/1998 | Landais et al. | |
| 5,833,097 A | * | 11/1998 | Ruth | G01F 19/00 141/280 |
| 5,927,558 A | | 7/1999 | Bruce | |

(Continued)

FOREIGN PATENT DOCUMENTS

WO    WO2013173139    11/2013

*Primary Examiner* — Paul R Durand
*Assistant Examiner* — Andrew P Bainbridge (57) ABSTRACT

The ground coffee dispenser for making coffee pods includes a tray from which extends a housing and storage compartment. The storage compartment features a door that opens to enable access to a coffee ground canister. The coffee ground canister is connected to a funnel that extends down to a dispensing member. The dispensing member is responsible for receiving a pre-defined amount of coffee grounds into a receptacle, tamping said pre-defined amount of coffee grounds inside of said receptacle via a plunger member, and then dispensing a tamped amount of pre-defined coffee grounds from said receptacle into a reusable single-serve coffee pod. The receptacle features an outlet that is positioned above a coffee pod support bracket. A dispenser conduit is seated inside of the receptacle, and includes a dispenser port.

2 Claims, 8 Drawing Sheets

(56) References Cited

U.S. PATENT DOCUMENTS

| | | | | |
|---|---|---|---|---|
| 7,284,679 | B2 * | 10/2007 | Zill | B65B 1/16 222/1 |
| 8,250,969 | B2 * | 8/2012 | Sampaoli | A47J 31/3619 99/287 |
| 8,534,507 | B2 * | 9/2013 | Gronholm | G01F 11/24 141/369 |
| 2003/0000393 | A1 * | 1/2003 | Levi | A47J 31/3614 99/279 |
| 2009/0293733 | A1 * | 12/2009 | Martin | G07F 13/065 99/280 |
| 2011/0068121 | A1 * | 3/2011 | Frei | A47J 31/404 222/1 |
| 2011/0209623 | A1 * | 9/2011 | Leung | A47J 31/44 99/287 |

* cited by examiner

GROUND COFFEE DISPENSER FOR MAKING COFFEE PODS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of ground coffee dispensing-machines, and more specifically, a ground coffee dispenser that is configured for use in re-filling reusable single cup serve coffee pods.

SUMMARY OF THE INVENTION

An embodiment of the disclosure meets the needs presented above by generally comprising a tray from which extends a housing and storage compartment. The storage compartment features a door that opens to enable access to a coffee ground canister. The coffee ground canister is connected to a funnel that extends down to a dispensing member. The dispensing member is responsible for receiving a pre-defined amount of coffee grounds into a receptacle, tamping said pre-defined amount of coffee grounds inside of said receptacle via a plunger member, grounds from said receptacle into a reusable single-serve coffee pod. The receptacle features an outlet that is positioned above a coffee pod support bracket. A dispenser conduit is seated inside of the receptacle, and includes a dispenser port. The dispenser conduit rotates along a horizontal access to enable the dispenser port to allow coffee grounds to enter inside of the receptacle, and conversely be dispensed into the outlet and reusable coffee pod. The plunger member extends laterally to tamp the coffee grounds prior to dispensing into the reusable coffee pod.

These together with additional objects, features and advantages of the ground coffee dispenser for making coffee pods will be readily apparent to those of ordinary skill in the art upon reading the following detailed description of presently preferred, but nonetheless illustrative, embodiments of the ground coffee dispenser for making coffee pods when taken in conjunction with the accompanying drawings.

In this respect, before explaining the current embodiments of the ground coffee dispenser for making coffee pods in detail, it is to be understood that the ground coffee dispenser for making coffee pods is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ground coffee dispenser for making coffee pods.

It is therefore important that the claims be regarded as including such equivalent construction insofar as they do not depart from the spirit and scope of the ground coffee dispenser for making coffee pods. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
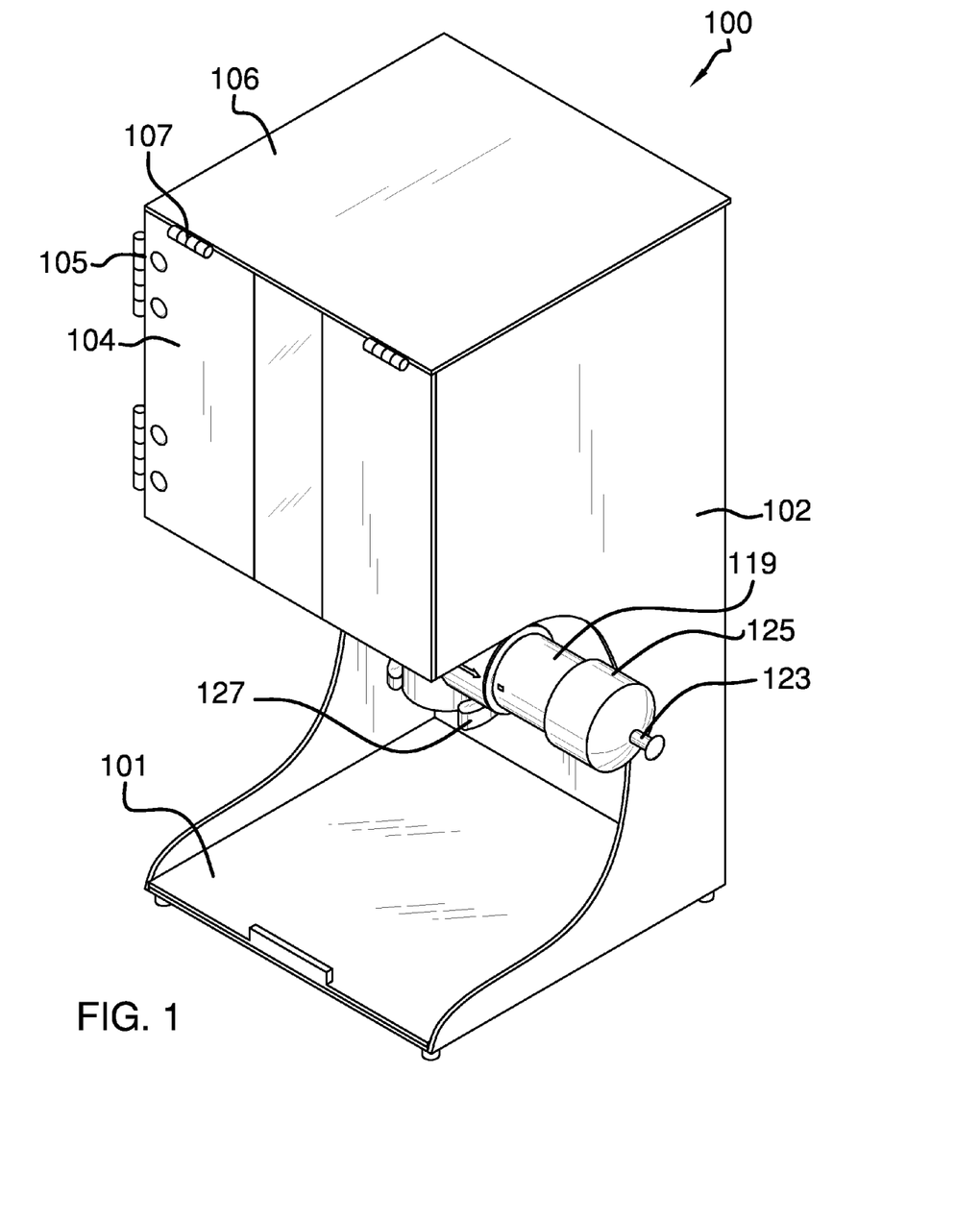
FIG. 1 is a perspective view of an embodiment of the disclosure.
Figure 2:
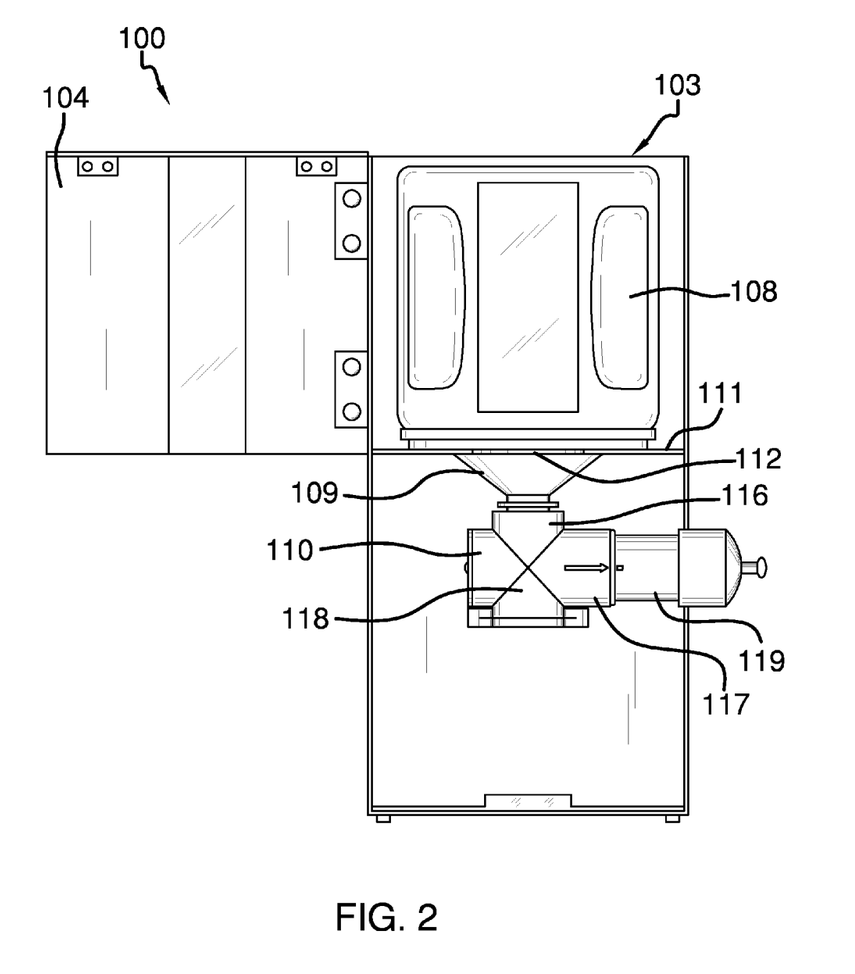
FIG. 2 is a front view of an embodiment of the disclosure.
Figure 3:
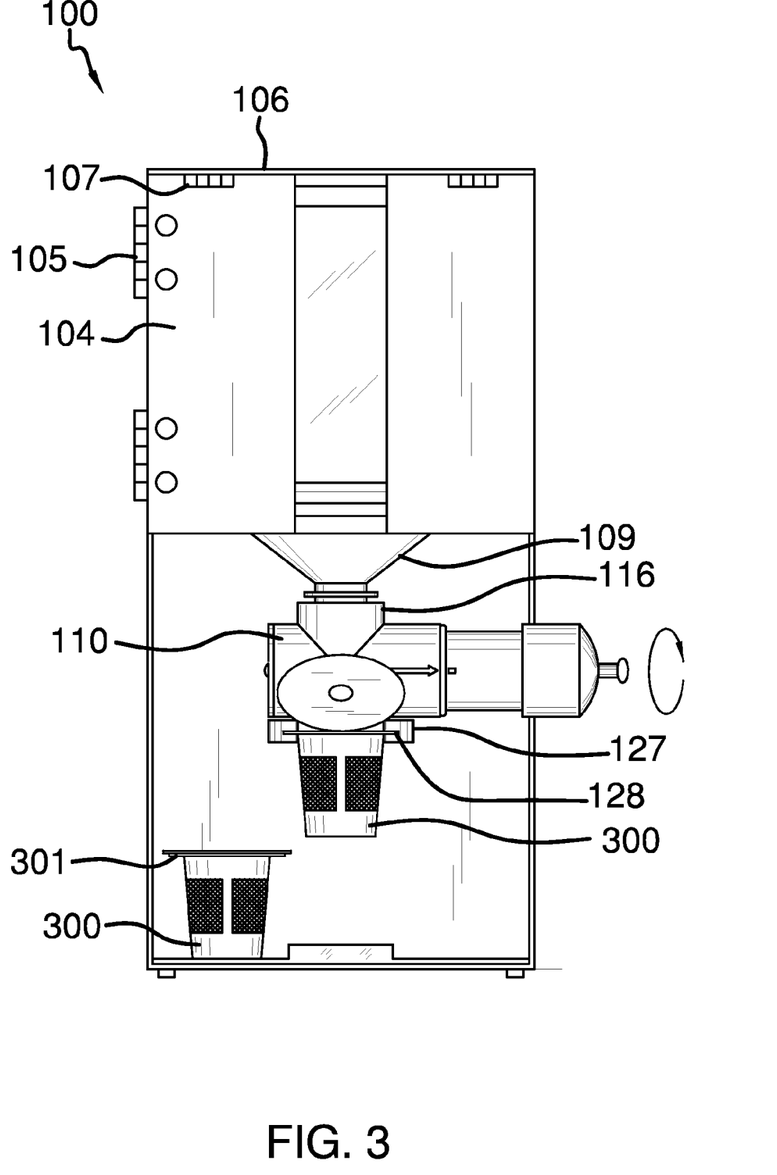
FIG. 3 is an in use front view of an embodiment of the disclosure.
Figure 4:
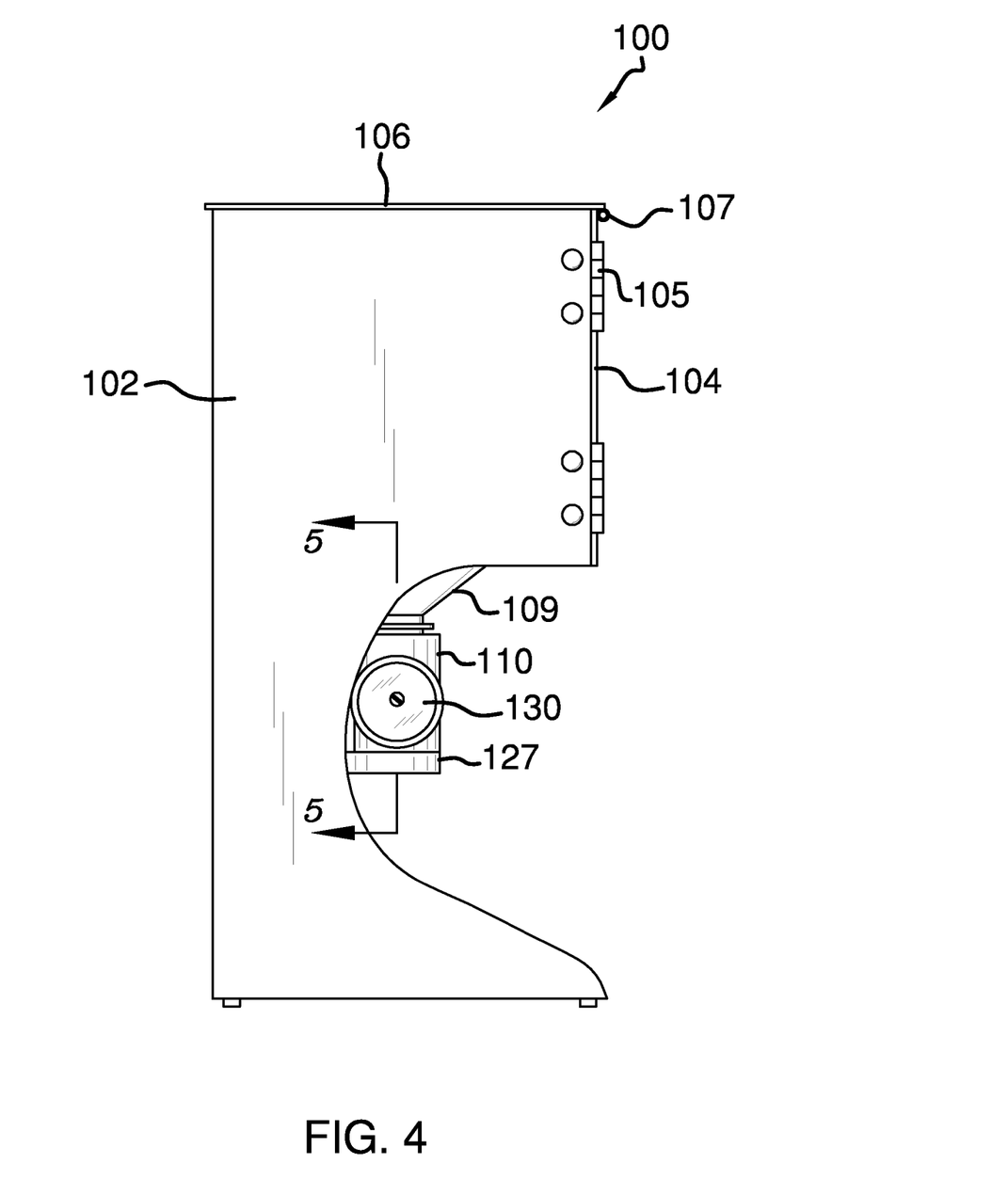
FIG. 4 is a side view of an embodiment of the disclosure.
Figure 5:
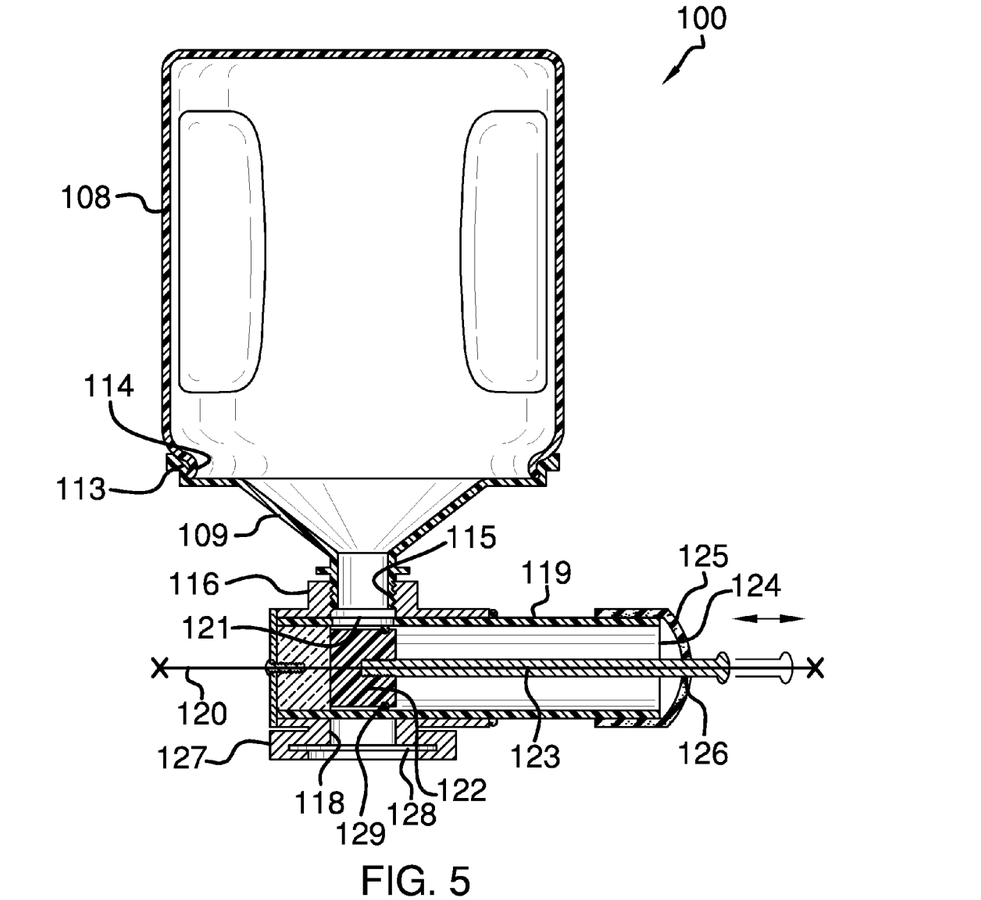
FIG. 5 is a cross-sectional view along line 5-5 in FIG. 4.
Figure 6:
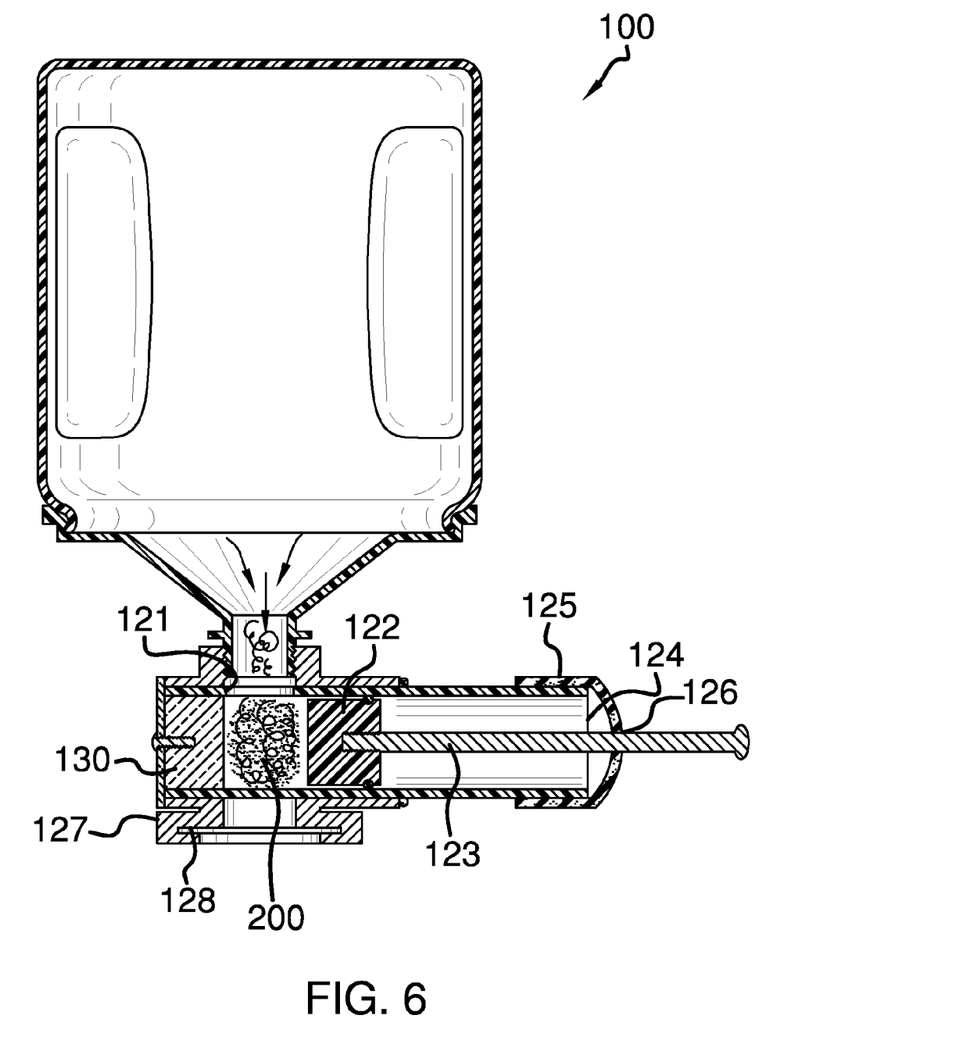
FIG. 6 is a second cross-sectional view along line 5-5 in FIG. 4.
Figure 7:
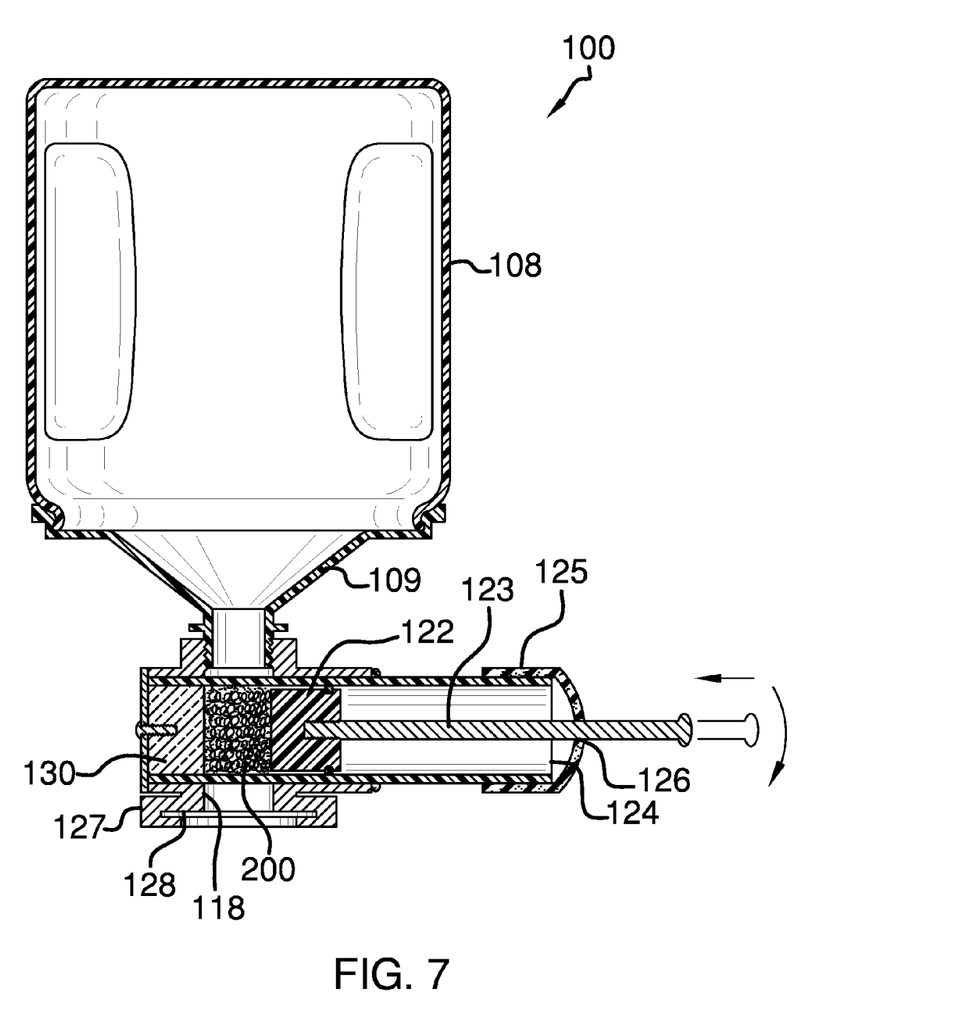
FIG. 7 is a third cross-sectional view along line 5-5 in FIG. 4.
Figure 8:
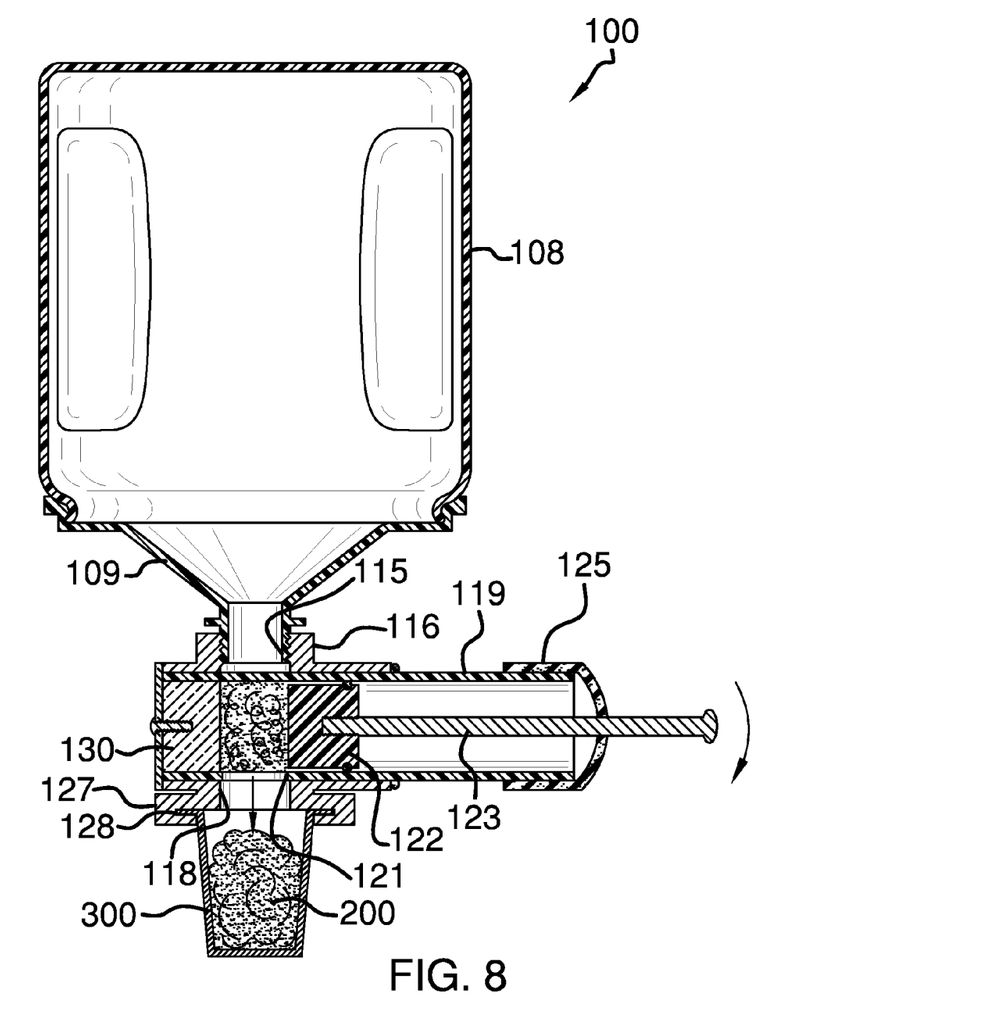
FIG. 8 is a fourth cross-sectional view along line 5-5 in FIG. 4.

As best illustrated in FIGS. 1 through 8, the ground coffee dispenser for making coffee pods 100 (hereinafter invention) generally comprises a tray 101 from which a housing 102 is provided thereon. A storage compartment 103 is aligned above the tray 101. The storage compartment 103 includes a door 104 that pivots about a first door hinge 105. The housing 102 is open from above, and includes a top member 106 that pivots with respect to the door 104 via a second door hinge 107. The tray 101 is responsible for collecting of any loose coffee grounds 200.

The storage compartment 103 contains a coffee ground canister 108 therein. The coffee ground canister 108 may be removable. The coffee ground canister 108 is inverted, and is affixed to a funnel member 109. The funnel member 109 attaches onto a dispensing member 110. The funnel member 109 partially extends through a storage compartment floor 111. Moreover, the storage compartment floor 111 includes a floor hole 112 that enables the funnel member 109 to rest thereon. The coffee ground canister 108 is responsible for storing the coffee grounds 200 therein. The funnel member 109 includes a lipped edge 113 that enables a canister lip 114 to be seated therein so as to make a secure connection between the coffee ground canister 108 and the funnel member 109.

The dispensing member 110 is gravity fed by virtue of being located underneath the funnel member 109. The funnel member 109 includes a threaded outlet 115 that attaches to a dispensing member inlet 116. The dispensing member 110 is further defined with a horizontal conduit 117 that is perpendicularly oriented with the dispensing member inlet 116 and a dispensing member outlet 118. The dispensing member outlet 118 is located opposite of the dispensing member inlet 116.

A dispenser conduit 119 is partially seated inside of the horizontal conduit 117 of the dispensing member 110. The dispenser conduit 119 is able to rotate about a horizontal axis 120. Moreover, the dispenser conduit 119 is able to rotate inside of the horizontal conduit 117 of the dispenser member 110. The dispenser conduit 119 includes a dispenser port 121 that when rotated about the horizontal axis 120 shall enable coffee grounds 200 to enter the dispensing member inlet 116 and conversely be dispensed out of the dispensing member outlet 118. That being said, the dispenser port 121 of the dispenser conduit 119 is able to align with both the dispensing member inlet 116 as well as the dispensing member outlet 118.

The dispenser conduit 119 is of hollowed construction, and includes a plunger member 122. The plunger member 122 features a plunger armature 123 that extends laterally out a dispenser conduit end 124. A dispenser end cover 125 includes a plunger hole 126 to enable the plunger armature 123 to move laterally with respect to the horizontal conduit 117. The plunger member 122 is responsible for tamping the coffee grounds 200 inside of the dispenser conduit 119, and prior to being released out of the dispenser port 121 and dispensing member outlet 118.

The dispensing member outlet 118 is located just above a coffee pod support bracket 127. The coffee pod support bracket 127 includes a slot 128 that enables a reusable coffee pod 300 to be inserted, and seated underneath the dispensing member outlet 118. Moreover, the slot 128 enables a reusable coffee pod lip 301 of the reusable coffee pod 300 to be inserted and removed. The coffee grounds 200 descend out of the dispenser conduit 119 via the dispenser port 121 and the dispensing member outlet 118.

The dispensing member 110 may include a viewing member 130 that is seated opposite of the horizontal conduit 117. The viewing member 130 is made of a translucent material that enables the coffee grounds 200 to be viewed entering the horizontal conduit 117. The plunger member 122 may include at least one gasket 129 to insure a watertight seat between the plunger member 122 and the horizontal conduit 117.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A ground coffee dispenser for making coffee pods comprising:
    a coffee ground canister connected to a funnel member that is positioned above a dispensing member;
    said dispensing member is responsible for receiving a predefined amount of coffee grounds, tamping of said coffee grounds, and being configured to dispense of said coffee grounds into a reusable coffee pod;
    wherein a tray from which a housing is provided thereon; wherein a storage compartment is aligned above the tray; wherein the storage compartment includes a door that pivots about a first door hinge;
    wherein the housing is open from above, and includes a top member that pivots with respect to the door via a second door hinge; wherein the tray is responsible for collecting of any loose coffee grounds;
    wherein the storage compartment contains the coffee ground canister therein; wherein the coffee ground canister is removable; wherein the coffee ground canister is inverted, and is affixed to the funnel member;
    wherein the funnel member attaches onto the dispensing member; wherein the funnel member partially extends through a storage compartment floor; wherein the storage compartment floor includes a floor hole that enables the funnel member to rest thereon; wherein the coffee ground canister is responsible for storing the coffee grounds therein; wherein the funnel member includes a lipped edge that enables a canister lip to be seated therein so as to make a secure connection between the coffee ground canister and the funnel member;
    wherein the dispensing member is located underneath the funnel member; wherein the funnel member includes a threaded outlet that attaches to a dispensing member inlet; wherein the dispensing member is further defined with a horizontal conduit that is perpendicularly oriented with the dispensing member inlet and a dispensing member outlet; wherein the dispensing member outlet is located opposite of the dispensing member inlet;
    wherein a dispenser conduit is partially seated inside of the horizontal conduit of the dispensing member; wherein the dispenser conduit is able to rotate about a horizontal axis; wherein the dispenser conduit is able to rotate inside of the horizontal conduit of the dispenser member; wherein the dispenser conduit includes a dispenser port that when rotated about the horizontal axis shall enable said coffee grounds to enter the dispensing member inlet and conversely be dispensed out of the dispensing member outlet; wherein the dispenser port of the dispenser conduit is able to align with both the dispensing member inlet as well as the dispensing member outlet;
    wherein the dispenser conduit is of hollowed construction, and includes a plunger member; wherein the plunger member features a plunger armature that extends laterally out a dispenser conduit end; wherein the plunger member is able to slide back and forth laterally within the dispenser conduit; wherein a dispenser end cover includes a plunger hole to enable the plunger armature to move laterally with respect to the horizontal conduit; wherein the plunger member is responsible for tamping the coffee grounds inside of the dispenser conduit, and prior to being released out of the dispenser port and dispensing member outlet; wherein the dispensing member outlet is located just above a coffee pod support bracket; wherein the coffee pod support bracket includes a slot that enables said reusable coffee pod to be inserted, and seated underneath the dispensing member outlet; wherein the slot enables a reusable coffee pod lip of the reusable coffee pod to be inserted and removed; wherein the coffee grounds descend out of the dispenser conduit via the dispenser port and the dispensing member outlet.

2. The ground coffee dispenser for making coffee pods according to claim 1 wherein the dispensing member includes a viewing member that is seated opposite of the horizontal conduit; wherein the plunger member includes at least one gasket to insure a watertight seat between the plunger member and the horizontal conduit.

* * * * *